United States Patent [19]

Mounce

[11] 4,340,936
[45] Jul. 20, 1982

[54] MICROPROCESSOR NAVIGATIONAL AID SYSTEM

[76] Inventor: George R. Mounce, 18 Bridle Path, Willowdale, Ontario, Canada, M2L 1C8

[21] Appl. No.: 165,840

[22] Filed: Jul. 3, 1980

[51] Int. Cl.³ ............................................. G01C 21/10
[52] U.S. Cl. ................................... 364/443; 364/444; 73/178 R; 340/27 NA
[58] Field of Search ............... 364/443, 444, 449, 424, 364/200, 900; 340/27 NA, 763, 706, 711; 73/178 R, 180, 181; 318/588

[56] References Cited

U.S. PATENT DOCUMENTS

| | | | |
|---|---|---|---|
| 3,396,378 | 8/1968 | Keith, Jr. | 340/763 |
| 3,821,523 | 6/1974 | Chisholm et al. | 364/460 |
| 3,875,388 | 4/1975 | Luten et al. | 364/424 |
| 3,881,094 | 4/1975 | Taylor et al. | 364/424 |
| 3,924,465 | 12/1975 | Sem-Sandberg | 73/181 |
| 3,934,129 | 1/1976 | Taylor et al. | 364/424 |
| 3,961,166 | 1/1976 | Stobart | 340/24 |
| 3,968,684 | 7/1976 | Hafner | 73/178 R |
| 3,979,057 | 9/1976 | Katz et al. | 364/443 |
| 4,107,988 | 8/1978 | Polsky | 73/178 R |
| 4,163,216 | 7/1979 | Arpino | 340/27 NA |
| 4,163,387 | 8/1979 | Schroeder | 364/443 |
| 4,189,727 | 2/1980 | Vaughn, Jr. | 340/711 |

Primary Examiner—Errol A. Krass
Assistant Examiner—Gary Chin
Attorney, Agent, or Firm—Dowell & Dowell

[57] ABSTRACT

A navigational aid system including a microprocessor having peripheral memory devices and being programmed by a read only memory, the system including sensors for measuring variable parameters and thumb switches for inserting known fixed data, and the microprocessor computing from such parameters and data readout data needed for optimum navigation taking into account such factors as leeway and current set and drift, the system having switches to select which data is displayed as the switches are sequentially polled, and the displayed data being accompanied by alpha indicia uniquely identifying each displayed numeric value.

13 Claims, 9 Drawing Figures

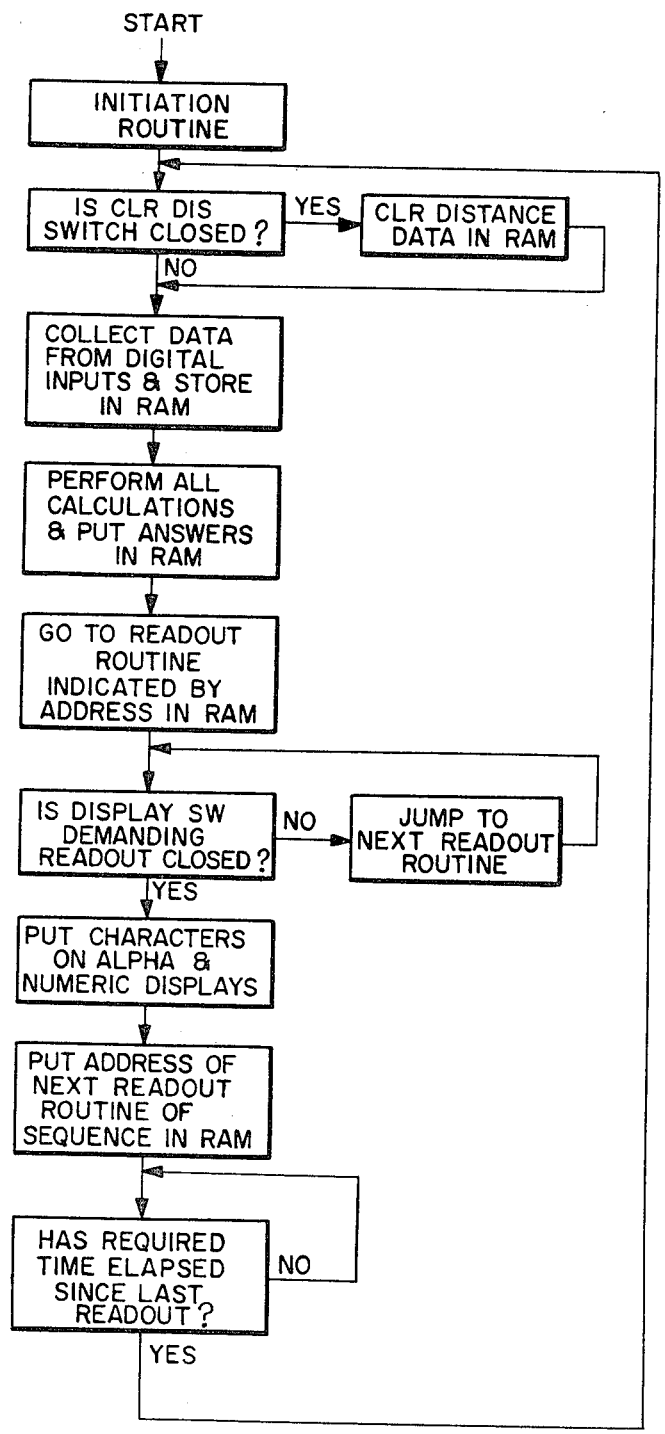

MICROPROCESSOR NAVIGATIONAL AID SYSTEM

BACKGROUND AND PRIOR ART

The optimum handling and navigation of a sailing craft or other vessel requires certain frequently-updated information. Some of this information is readily obtained from instrumentation of a type commonly found on sailing craft such as a heading sensor (compass), velocity sensing equipment capable of determining both the speed of the boat in the forward direction and the speed of the boat at 90 degrees to its heading (leeway), and sensors for determining the apparent wind direction and speed. However, in normal use these five measurable parameters require mental interpolation by the operator of the boat, and such interpolation requires a high degree of judgment and experience. The exercise of such judgment has been helped in the prior art by various applications of analog and digital computing techniques which determine for the operator certain data relating to navigation which would permit the operator to know more precisely what he is doing from a quantitative point of view.

For example Taylor et al. U.S. Pat. No. 3,934,129 provides indications of average apparent wind direction and average boat speed using integrating techniques and a suitable computer. This patent also computes relative wind speed. Taylor et al. U.S. Pat. No. 3,881,094 uses a somewhat different technique for determining average boat speed and average apparent wind speed and direction, taking samples over discrete intervals of time, integrating the samples, and dropping the oldest of the samples during each sampling period. In U.S. Pat. No. 3,968,684 to Haffner, there is a further improvement resultinhg from measurements of leeway and using them to improve the determination of actual motion of the boat over the bottom.

U.S. Pat. No. 3,961,166 to Stobart is of interest in that it resolves increments of vehicle motion into distances traveled along two normal axes, and then combines these distances by taking the square root of the sum of the squares.

U.S. Pat. No. 3,875,388 to Luten et al. uses the idea of multiplexing information such as apparent wind speed and direction and hull speed into a computer which provides an output indication of the performance of the boat, the system also receiving additional information such as compass course and wave effects.

Efforts have also been made to provide an indication of actual progress toward a selected destination mark. In Polsky U.S. Pat. No. 4,107,988, an analog system of computation is used to determine progress made in an effort to hold a predetermined course toward a mark. In Chisolm et al. U.S. Pat. No. 3,821,523, there is a set of thumb switches used to set the coordinates of a destination mark into a computer. When this has been done distance signals are exchanged with a plurality of ground based DME stations and the measured distances are used to compute progress toward the coordinates set into the computer manually.

However, the prior art systems designed for use on sailing craft have generally provided only a few of the outputs which would be necessary to achieve truly optimum navigation of the boat, and these readouts are generally not consolidated and presented to the observer in such a manner as to provide quick answers without requiring an excessive amount of attention or constant manual intervention by the operator so that his attention is drawn away from his other duties at the helm in derogation thereof.

Moreover, the raw data which is directly measurable on moving craft, including its compass heading, hull speed and leeway, and apparent wind speed and direction, is not itself the final readout needed for optimum navigation. Because of the motion of the boat such readouts cannot be directly measured by instrumentation. For example, the movement of the vessel greatly changes both apparent speed and direction of the wind. The computation of vectors required for indicating actual movement of the boat over the bottom, and actual wind direction and velocity, are fairly complex and would be quite burdensome to the operator of the vessel using a pocket calculator. Moreover, vectors determined using a pocket calculator would be so few in number, and so far apart in time, as to make it practically impossible to produce accurate averaging. Averaging is of course highly desirable since it is almost impossible to hold a constant course or speed in a small sailing boat since boat heading and wind velocity are constantly changing. In addition, parameters such as leeway are continuously varying, since they depend not only upon the physical configuration of the particular boat hull, but also upon said trim and relative wind direction and velocity. Leeway can be rather a large factor, sometimes introducing a course error which can amount to twenty degrees with respect to the apparent compass heading. Mental estimates of leeway drift are difficult at best, and always inaccurate. The same is true of efforts to estimate the actual course and progress made good by the vessel over the bottom. Estimates infrequently made provide very sparse data. Thus, it is necessary to achieve averaging of a large number of calculations made at a high rate in order to determine with any degree of accuracy the actual progress of the vessel toward a predetermined destination mark.

THE INVENTION

The present navigational system comprises a microprocessor (MPU) having busses for receiving input data and for delivering output data. Five accurately measurable variable parameters are inserted, these variables including wind direction and speed, hull speed and leeway, and compass heading, and these variables are standarized by suitable interfaces as to form, and are delivered to a switching unit so that one variable at a time is selected and delivered to an analog to digital converter. The converted digital signal is then delivered from the A/D converter through a peripheral interface adaptor (PIA) and made available to the microprocessor by interrupting its main routine whenever the A/D converter has converted a new input parameter and the PIA signals that this input is ready. The A/D conversions are fairly slow, and therefore the computer has time to proceed with its main routine between such conversions. A read only memory (ROM) controls the computations performed by the microprocessor during the main routine, using the measured input parameters from the sensors as stored in a random access memory (RAM), and using fixed manually inserted input data giving the course and distance from an origin point to the destination mark and also giving the current set and drift in the area where the sailing is being done. From these measured and fixed inputs, a large number of different readouts can be computed, these being the output data displayed for optimal navigation. The present illustrated embodiment shows more than a dozen readouts which are processed and displayed, and a display control unit is provided with a switch for each calculated readout by which the operator can selectively display or skip that value. The invention teaches the sequential polling of these control switches and the sequential display of calculated values corresponding with each switch which is actuated to select display of that value. The main routine of the microprocessor calculates selected readouts sequentially and displays selected ones thereof so that each value is displayed for an interval of time long enough to make it easy to read. Approximately two seconds display for each value appears to be a satisfactory interval, and this interval is long enough to permit the microprocessor to proceed with its main routine or an interrupt routine thereduring. In view of the fact that it is necessary to identify the character of each readout, one of the peripheral memory chips also contains alpha indicia which is displayed along with the numeric display for each calculated value which has been selected by one of the manual switches. Thus, the display is both alpha and numeric. If only a single one of the possible readouts is selected, its display is continuous, except that as data input to the calculator from an input sensor changes the readout will be up-dated to show the latest calculated output.

OBJECTS AND ADVANTAGES

It is the principle object of this invention to provide an information gathering, processing and display system using a microprocessor which collects information from certain sensors which measure parameters readily obtainable on a moving vessel. The system processes those parameters into readout information which is of greater utility but is not itself directly measurable aboard the moving vessel. The microprocessor system calculates such values as actual wind direction and speed, actual boat direction and speed over the bottom, relative wind direction on the port side, or on the starboard side, leeway angle, course and distance to or from a destination mark, or course and distance from an origin at the beginning of the course being traversed by the boat, etc.

It is another very important object of the invention to provide a system capable of making calculations at a high rate from the raw data being collected as measured parameters from the sensors because the raw data is all interrelated and continuously varying, so that manually made calculations would provide only very imcomplete and sparse data. The rapidity of the calculations and the high repetition rate permit effective integrating of the values to provide much more accurate information as to the progress and ultimate position of the boat with respect to an origin point or with respect to a destination mark.

It is another major object of the invention to provide a system which collects and calculates navigational data and presents this data as readouts directly to the helmsman in the cockpit, this being data which formerly has been available only to the navigator below, and in very small quantity as a result of considerable labor on his part. The present invention provides a display control unit and a separate display unit which can be respectively mounted at locations aboard the vessel where the units are most needed or convenient to use.

Another major object of the invention is to provide a readout system which sequentially indicates on a single integrated display any or all of the measured parameters and any or all of the computed readout data, with each numeric display quantity appearing accompanied by an alpha display which identifies the nature of the companion quantity. This permits the use of a single display to display a great variety of different data in a nonconfusing manner, the data being presented sequentially and in every case being identified by an adjacent alpha display.

It is still another important object of the invention to provide a system having an automatic routine which sequentially displays the calculated information and companion alpha identification, but which can be manually controlled by the operator to omit, or include, any selection of measured or calculated data. The system provides a set of display switches so arranged that the actuation of the switches determines which data will be displayed and which will be passed over without display, whereby the operator can elect to display in more rapid succession only those quantities which particularly interest him at the moment. The displays then appear successively as selected without requiring any further attention on his part.

Still another important object of the invention is to provide a microprocessor (MPU) system in which a main routine continuously runs through the calculations and stores output data in an addressable RAM memory from which the data is recalled for display as the main routine progresses. However, new measured data is collected by a separate sequence which is part of an interrupt routine which can interrupt the main routine whenever newly collected data has been processed and made available for use in the system. The microprocessor, thus interrupted, receives the measured data and stores in the addressable RAM memory in appropriately addressed slots from which the data can be removed for use during subsequent calculations or for purposes of display. In this way, the data is always being updated during the calculation and display routines and it is not necessary therefore to have the main routine halted and put in a wait mode during intervals of time when the raw data is being processed, for instance by A/D conversions which are time-consuming. It is recognized that A/D converters exist which are very fast in their operation, and which could therefore be used as part of the main routine without requiring a separate interrupt routine, as is used in the preferred embodiment discussed below.

Still another object of the invention is to provide a navigation system in which fixed parameter information such as the distance and direction from the origin to a destination mark is manually entered, as well as other fixed data such as current drift and set, whereby very useful readouts can be calculated relating the actual position of the boat to the destination mark and to the origin at a moment in time when the vessel has sailed partway between the origin and the mark.

Other objects and advantages of the invention will become apparent during the following discussion of the drawings.

THE DRAWINGS

FIG. 6 is a flow diagram of the system;

DESCRIPTION OF PREFERRED EMBODIMENT

Figure 1:
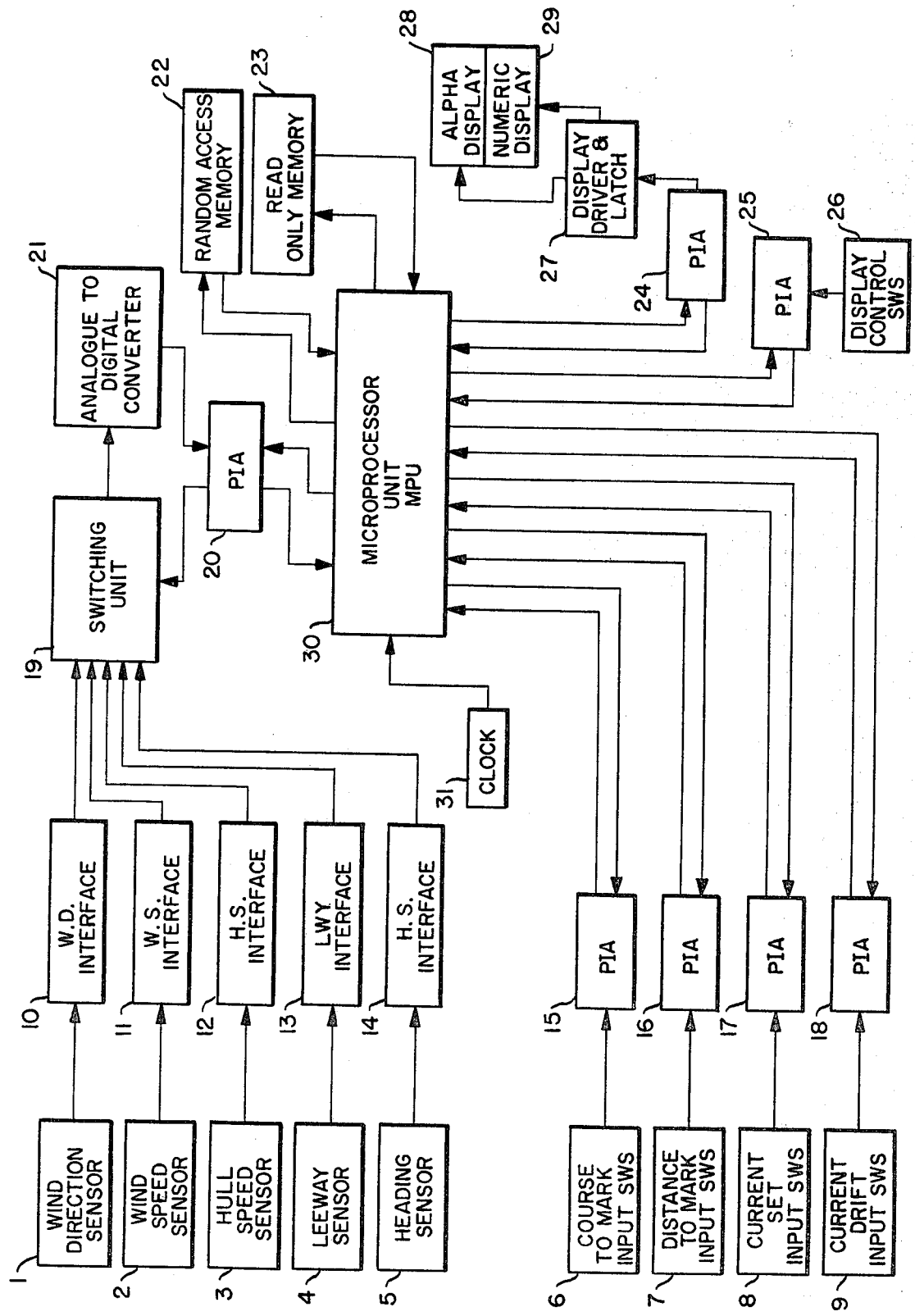
FIG. 1 is a block diagram showing an embodiment of the microprocessor navigation system according to the present invention.
Figure 3:
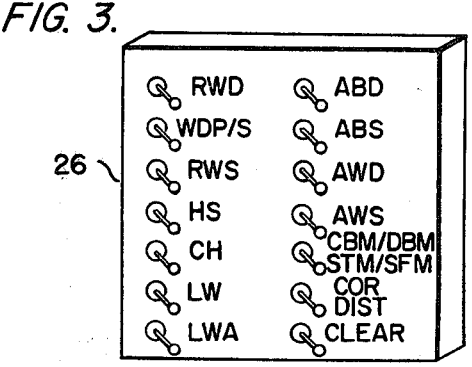
FIG. 3 is an isometric front view of a display control unit according to the present invention.

Referring now to FIG. 1, this block diagram shows a microprocessor MPU 30 which is coupled through PIA peripheral interface adaptors 15, 16, 17, 18 and 20 to receive input data representing various fixed and measured parameters from which readout calculations will be made. These parameters include measured input data taken from sensors 1, 2, 3, 4 and 5, and fixed input data taken from thumb switch inputs 6,7,8 and 9. All of these fixed and variable input parameters are either initiated as digital data, or are converted into digital form in a manner to be hereinafter explained more fully. The microprocessor 30 is further coupled with an addressable random access memory RAM 22 and a read only memory ROM 23, the RAM storing fixed and variable input parameters as well as calculated data, and the ROM storing programs used to establish the routines of the microprocessor system as well as an initiating routine for programming the PIA units. The ROM also stores alpha indicia for use when displaying output information on the alpha numeric display 28 and 29, which is driven by a display driver and latch 27 actuated through a PIA 24. A display control unit 26 as shown in FIG. 3 of the drawings cooperates with the PIA 25 to determine during each sequential display loop which data will be displayed and which data will be passed over without display, all as manually selected, FIG. 3, by the operator of the system.

Referring now to the input parameter sensors 1, 2, 3, 4 and 5, there are various different instruments which can be used to acquire information as to these measurable values all of which are easily measurable from a moving boat. The wind direction sensor 1, for example, typically comprises a potentiometer capable of continuously rotating through and beyond 360 degrees. The potentiometer is turned by a wind vane at the mast head and delivers a voltage to the wind direction interface 10 which is proportional to the angular position of the potentiometer. The wind direction interface 10 typically includes an amplifier having adjustments to set the total variation of voltage achieved by the potentiometer within a voltage range acceptable to the A/D converter 21. Circuits of this sort are well-known in the prior art and need no further discussion.

Figure 8:
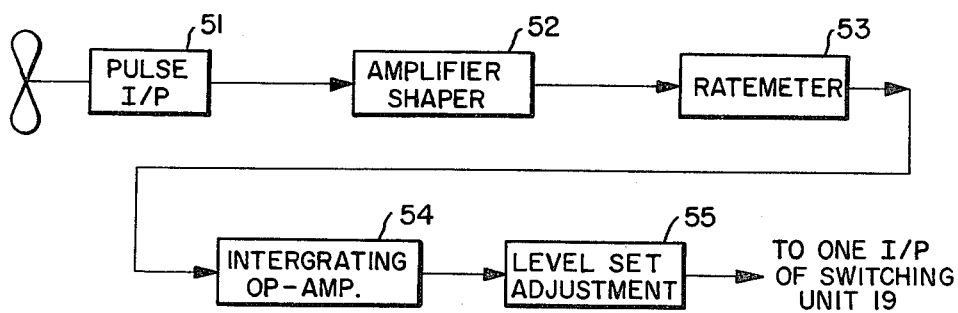
FIG. 8 is a block diagram showing a typical speed sensor and interface means therefore.

The wind speed sensor 2, the hull speed sensor 3, and the leeway sensor 4 can all be of the general type shown in FIG. 8 wherein an air or water driven impeller rotates a small pulse generator 51 which delivers pulses at a rate proportional to the rotation rate of the impeller. Each of these impellers feeds into an interface such as is shown in the boxes 11, 12 and 13, and each of these contains a shaper amplifier 52, FIG. 8, driving a rate meter 53 which in turn drives an integrating operational amplifier 54 which in turn drives an adjustable circuit by which the operating level of the integrated DC voltage can be set within a range acceptable to the A/D converter 21. One form that the rate meter 53 can take is a one-shot multi-vibrator which, upon being triggered, produces an output pulse of constant amplitude and duration. These pulses have pre-determined DC values whereby the number of pulses occurring per unit time can be integrated to provide a DC value proportional to the rate at which the pulses are received from the impeller. The level set adjustment 55 may comprise an adjustable potentiometer which scales the integrated DC level so that it can be used to represent to the microprocessor 30, when converted to digital form, the wind or water velocity driving the impeller. Thus, the level adjustment provides sensor calibration. Sufficient integrating time is provided in the operational amplifier 54 so as to smooth the pulses, but this interval should not be so long as to make the sensor excessively unresponsive to changes in the speed of the medium being sensed.

The heading sensor for the boat generally comprises a compass having either a digital or an analog readout, many such compasses using a grey code. The compass itself can be either fluxgate, gyro or magnetic. With certain compasses having a digital readout no further conversion is necessary. However in the case of compasses having a grey code readout the heading sensor interface 14 will require grey code conversion, and suitable conversion units are often supplied by the compass manufacturer. Assuming that in this case the readout is analog, then the heading sensor interface 14 will convert it to an analog range suitable for delivery to the A/D converter 21. For purposes of the present disclosure, it will be assumed that the output from heading sensor 5 is analog, thereby making it compatible with the other analog outputs all of which pass through the A/D Converter 21. The compass is a purchased item, and the details thereof form no part of the present invention.

All of the outputs from the interfaces 10 through 14 present their variable analog input data to a switching unit 19 which selects one input data source at a time and delivers its signal to the A/D converter 21 for conversion to digital form which can be used by the central processing unit 30. The switching unit 19 and A/D Converter 21 cooperate with the PIA 20 to deliver to the microprocessor unit 30 the measured input data as it is converted and made ready for use, the data being then stored in the addressable RAM 22 in unique address locations for each of the input variable parameters. The procedure for taking the variable parameter data from the sensors through the switching unit 19 will now be explained, the data being read from the PIA during an interrupt sequence, then is stored in read only memory 23. The interfacing means required to pass all peripherally derived information in and out of the MPU 30 comprises the various PIA units labeled 15, 16, 17 and 18, 20, 24 and 25 on the diagram of FIG. 1.

These PIA units in the present disclosure are all Motorola integrated circuit type MC6821 which are specially constructed to cooperate with the MC6800 Motorola microprocessor 30 used in the present illustrative embodiment. Each MC6821 PIA chip actually comprises two independent interface sections having substantially identical characteristics. Considering one of these sections, it comprises a data register coupled with 8 ports which may be input ports or output ports, or may be divided between input and output ports. Each unit also includes its own data direction register which is programmed during the initial routine to determine the direction of data flow at the eight ports, and further includes a control register which controls the functioning of the section. One section of PIA 20 is set up during the initiation routine to have four ports programmed as outputs to control switching unit 19. The PIA data register is set up to serve as a four-bit RAM and is loaded during initiation with the code for the first variable measurement parameter to be passed by the switching unit 19. The address where the first digital value determined by the A/D converter is to be stored was put in RAM 22 during initiation.

When the A/D converter 21 is ready with a converted variable parameter it delivers a "data ready" (end of conversion) pulse to PIA 20. The PIA has input/output circuits which pass an interrupt signal to the MPU 30 to interrupt the MPU, whereupon it jumps to the A/D readout routine. The second section of PIA 20 handles the actual data from A/D converter 21 appearing as an eight-bit code. Using the data address put in thed RAM at initiation for the location at which the data is stored, the MPU 30 stores the data in RAM 22. When all digits have been thus transferred, MPU 30 sets up the conditions for the next data readout by putting the appropriate code for next controlling switching unit 19 into the first section of PIA 20 so that the second analogue parameter is processed, at the same time changing the address in RAM 22 to indicate where the next readout should be stored. MPU 30 then returns to the main program and continues until interrupted the next time that A/D converter 21 has data ready. At the end of the interrupt routine serving to convert the last of the analogue inputs, the control code put in the first section of PIA 20 will be the code for passing the first of the analogue signals through switching unit 19, and the address put in the RAM will be the location at which the first analogue data is to be stored. This sequence continues around and around.

The fixed input data to the system which is entered manually by rotary thumbswitches included in the units 6, 7, 8 and 9 is already in digital form, this information comprising information as to the position of a particular destination mark from an origin by specifying distance and direction to the mark, and this information also comprising manually inserted current drift and set information in terms of speed and angle of the current expected in the water at that particular location. These thumbswitches being already binary coded, provide digital outputs to the PIA units 15, 16, 17 and 18, each of which is operative upon being addressed by the microprocessor unit 30 to deliver digital input representing the associated fixed parameter. The microprocessor 30 can use this information for calculating its readouts, for example representing the location of the vessel with reference either to the origin or to the destination mark, as well as other readouts to which this information contributes.

Such inputs of both measured digital data and fixed digital data can obviously be extended by providing additional sensors and binary coded thumbswitches and PIA units as may be required to extend the capability of the system to suit specific uses to which it can be put.

The main routine for the processing unit will now be described with reference to FIG. 6, and thereafter the interrupt routine for entering new variable data into the system will be discussed in connection with FIG. 7.

The main routine as shown in FIG. 6 is started by putting into the computer the first address of the ROM which begins with the initiation routine. Note that this initiation routine is executed only on start-up of the system. The initiation routine programs the PIA registers to carry out their individual functions, i.e. (a) codes the switch 19 with a switching sequence by reading into PIA 20 the proper code to pass the first analog signal to be read to the A/D converter 21, (b) puts addresses into the RAM 22 that will be used later in the A/D program to index the data to the proper random access locations, (c) puts the starting address of the first readout routine in the RAM 22, which address is used later to direct the program to that readout routine at the correct point in the main program, (d) puts a starting address in the RAM for the A/D readout routine so that, upon an interrupt signaling that such data is ready to be read out from the A/D converter, the processor will jump to that address, and (e) inserts into the PIA units such other encoding as is necessary to make them carry out their functions cooperatively with the other units of the system.

After initiation, the program enters the main routine loop. At the origin of the present leg of the cruise, the previous leg's data in the RAM 22 must be cleared in order that new information with respect to the new origin can be built up as the cruise progresses. At the beginning of the program loop, therefore, the program ascertains if the clear CLR switch (manually set by the operator, FIG. 3) demands that the obsolete data in the RAM be cleared, and the microprocessor 30 performs that function if so directed. If a CLR operation is not required, the program by-passes that section of the routine and proceeds to collect fixed data sequentially from all the digital thumb wheel switches 6, 7, 8 and 9 shown in FIG. 1. The fixed data so collected is put in addressable locations in the RAM. Measured data from the A/D Converter 21 is then collected and put in the RAM by an interrupt program as will be subsequently described with reference to FIG. 7. The ROM program then enters the calculation portion of the routine, wherein the data is recalled from the RAM and calculations are performed so that upon completion of the routine all the readout data required for display is stored in the RAM.

Once the data to be read out has been computed and stored, the program is ready to display whatever information is demanded by the switches in FIG. 3, and begins with the address initially set into the RAM. At the end of each readout routine is stored in the RAM. At the start of the next readout routine, the MPU 30 picks up that address from the RAM and goes to the readout program thus indicated. If a switch on the display control unit 26, FIG. 3, demands display of some stored data, the routine continues and the appropriate numeric value is displayed under the corresponding alpha indicia identifying that particular readout. If the display control switch is not actuated to require display of the corresponding information during the readout routine, the program immediately jumps to the next sequential display routine and checks the display control switch for that readout to see if display is required. This process is continued until a display routine is found with a corresponding display control switch demanding a readout.

After a readout routine has been executed, the address of the next readout routine in the sequence is stored in the RAM so that the MPU 30 will be directed to perform the correct subsequent readout. If the routine just executed was the last in the sequence, the address of the first routine in the sequence is put in the RAM.

The program is on a real time basis, which is desirable because the calculations involving speed and distance also involve real time. Clocking of the MPU through the programs is precisely controlled from a crystal-controlled clock oscillator 31. The oscillator may be the same one that provides the timing signal to the microprocessor 30 or it may be an independent oscillator. All that is required is that timing signals be produced at precise intervals. In our case, we use a period of 2 seconds because that appears to be a good length of time for reading the display. There is one other important criterion determining the duration of display routines, and that is that there must be enough time to insure that the complete routine can be executed thereduring. A 2-second display interval is very sufficient.

Following execution of a readout routine, the program, having put in the RAM the address of the next readout routine, goes into a holding loop and waits until a signal from the timing circuit indicates that the prescribed duration of the present display routine has elapsed. As soon as that happens, the program jumps to the clear distance CLR DIS routine and re-enters the main loop as previously described.

Figure 7:
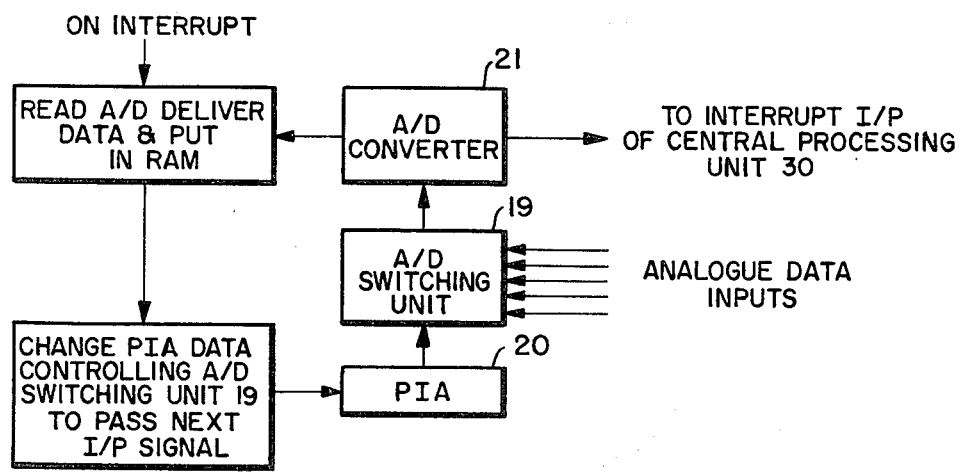
FIG. 7 is a diagram giving a simplified showing of an interrupt routine of the microprocessor.

Referring now to FIG. 7, as mentioned before, the measured parameter data from A/D Converter 21 is not collected and stored during the main program loop. Instead, an interrupt routine is interposed each time data is ready. Interrupt features are standard with microprocessors. An interrupt signal causes the microprocessor 30 to store all data concerning the portion of the main routine under way at the time of the interrupt, and then jump to an interrupt program, FIG. 7, with a starting address specified in a RAM. At the conclusion of the interrupt routine, the MPU picks up the temporarily stored data and resumes its status prior to interrupt and returns to the main program.

In the case of the preferred embodiment, an interrupt signal is generated when the A/D Converter 21 has stored its data in PIA 20 and the PIA is ready with that data to be transferred into the microprocessor. Upon receiving an interrupt signal from the PIA, the microprocessor jumps to the interrupt routine and takes that data from the PIA 20 and transfers it to the RAM for storage at an address determined by the accompanying address coding in the register of PIA 20. The PIA also determines the next position of the switching unit 19 so as to select which measured parameter will next be connected to the A/D Converter 21. As soon as ready data from PIA 20 has been thus transferred, the routine in the register of PIA 20 is automatically incremented to advance the switching unit 19 to pass the next measured analog signal in the sequence to the A/D Converter 21. When the last analog input signal in the sequence has been read, the routine in PIA 20 is incremented to the beginning of its loop.

The advantage of transferring the A/D Converter information during interrupt routines as described rather than collecting the data as part of the main routine is that it saves computer time. The action of an A/D Converter is very slow compared to the speed of the microprocessor, so that the main routine would have to remain in hold until the next measured data input was ready for transfer to the MPU and to the RAM. Furthermore, the data would be collected only once per complete loop of the main program. Using the described interrupt system, the data can be updated at any time during the main routine. There are certain other advantages in programming, for instance, if a change were needed as would be the case if the number of analog inputs were changed.

Figure 2:
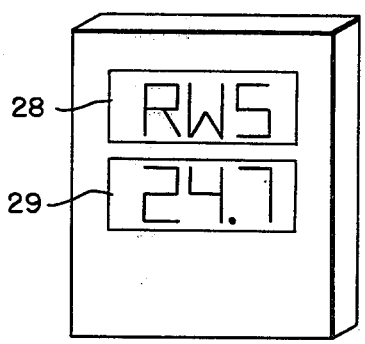
FIG. 2 is an isometric front view of a readout display unit according to the invention.

The way in which information is displayed in the present system is one of the major features of the invention, the information being displayed including both measured input variables to the system and computed readouts of navigational data, all to be displayed at the units labelled 28 and 29 in FIG. 1 and shown pictorially in FIG. 2. In the computations made by the microprocessor 30, real time is an important factor since it is closely related with the concept of speed and distance made good, and therefore an accurate timing source is included and shown as the clock 31 in FIG. 1. This clock provides both real time input into the system and also provides pulse sequences which clock the various units through the various routines. The display time periods are selected so as to provide easy reading of the alpha display 28 and the numeric display 29. It has been judged that a display interval of 2 seconds is satisfactory, although longer or shorter intervals can be used without substantially altering the operation of the system. These display intervals are also used in the main routine to divide it into intervals of time during which the various calculations are carried out by the microprocessor unit.

At the beginning of each display interval the microprocessor 30 is directed by the information stored in the read only memory 23 to interrogate the PIA 25, which then outputs information to the microprocessor uniquely describing the condition of the next selection switch in the display control switching unit 26. If the switch is actuated calling for the display of data pertinent to that particular readout routine, the sequence is continued to make the display, whereas if the switch is not actuated, the microprocessor jumps to the next readout routine and the polling of its switch then takes place. In this way, the polling of display control switches in the unit 26 is automatically sequenced. Once a readout selection switch has been found calling for a display of data corresponding with that switch in the display control unit 26, FIG. 3, the routine is continued by first taking identifier indicia from the ROM 23 which writes in the designated alpha letters in the display 28 identifying the nature of the information which is called for. The alpha display is delivered through the PIA 24 and the display drive and latch 27. The microprocessor is then directed by the ROM to extract the required readout information from the RAM 22 and route it through the PIA 24 into the display drive and latch 27 which delivers it to the numeric display 29. Once this alpha and numeric information has all been latched and displayed, it is held there unchanged during the remainder of that particular routine, i.e. two seconds, while the microprocessor proceeds with whatever other operations and calculations are appropriate according to the main routine.

The particular type of alpha numeric display desired can be chosen based upon the needs in a particular installation, for instance, liquid crystal displays being used for external installations since they reflect ambient light, and LED displays being used below decks since their glow would be appropriate for subdued-lighting surroundings. The alpha display comprises three 16-segment units, whereas the numeric display comprises three standard 8-segment units. Appropriate decimal points of course are included in the numeric displays. Obviously repeater stations showing the information as illustrated in FIG. 2 can be placed at several strategic locations aboard the vessel. When only a single readout variable is selected, its display is continuous, but its numeric value will be updated every two seconds. If two variables are selected, the readout alternates between them.

Referring now to FIG. 3 of the drawings, the alpha identifiers for each readout to be displayed are shown next to switches that select the display of the corresponding data when actuated. The following listings are intended to show how the various readouts are arrived at, some by actual measurements using the sensors 1, 2, 3, 4 and 5 in FIG. 1, and some by calculation using these measured parameters together with the four fixed parameters inserted at the thumb switches 6,7,8 and 9 in FIG. 1. These are:

| COURSE TO MARK | CTM (from origin) |
| DISTANCE TO MARK | DTM (from origin) |
| CURRENT SET | CUS (direction) |
| CURRENT DRIFT | CUD (speed) |

The displayed readouts are as follows:

RELATIVE WIND DIRECTION (Measured parameter)

Alpha: RWD
Numeric:
Direct display of the position of the Wind Direction Sensor 1 (usually mounted on top of the mast) which indicates wind direction with respect to the center line of the boat on a 360 degree basis.

WIND DIRECTION PORT, WIND DIRECTION STARBOARD (calculated value)

Alpha:
WDP or WDS (automatically selected and displayed depending on which side of the vessel is to windward).
Numeric:
for WDS same as RWD from 0 to 180 degrees. For a relative wind direction greater than 180 degrees, the readout displayed is 360-RWD. The purpose of this readout is to display to the helmsman a direct indication of how close to the wind he is steering the boat showing angles that read the same whether he is on a port or a starboard tack.

RELATIVE WIND SPEED (measured parameter)

Alpha:
RWS
Numeric:
displays the relative wind speed obtained from the Wind Speed Sensor 2 in specific units such as knots or miles per hour.

COMPASS HEADING (measured parameter)

Alpha:
CH
Numeric:
displays magnetic compass heading of the craft on a 360 degree basis.

HULL SPEED (measured parameter)

Alpha:
HS
Numeric:
displays the component of the speed of the boat through the water in the center-line direction, as determined by the Hull Speed Sensor 3, in specific units such as knots or miles per hour.

LEEWAY (measured parameter)

Alpha:
LW
Numeric:
displays the component of the speed of the boat through the water in a direction at right angles to the hull center line, as determined by the Leeway Sensor 4, in specific units such as knots or miles per hour.

LEEWAY ANGLE (calculated value)

Alpha:
LWA
Numeric:
displays the angle between the actual direction of movement of the vessel and the hull center line.

$$LWA = \text{Tan}^{-1} \frac{LW}{HS}$$

ACTUAL BOAT SPEED (calculated value)

Figure 5A:
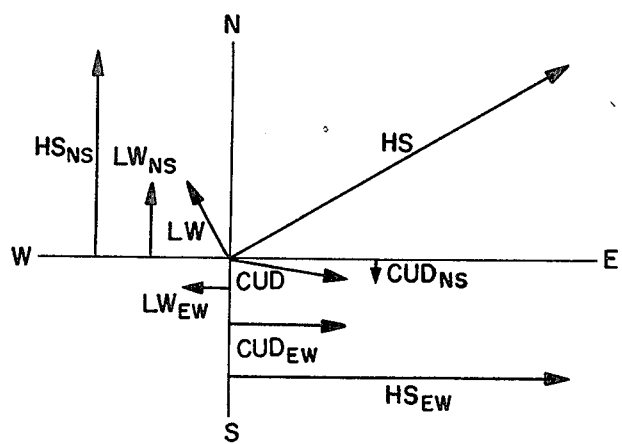
FIGS. 5a and 5b are related diagrams showing the relationship between various vectors involved in the navigation of a vessel.

Alpha:
ABS
Numeric:
displays actual speed of the vessel over the bottom in specific units such as knots or miles per hour, FIGS. 5A and 5B, by first calculating the component of boat speed in the north/south direction, i.e.

$$ABS_{ns} = HS_{ns} + LW_{ns} + CUD_{ns}$$

where:

$HS_{ns} = HS \, \text{Cos}CH$ $LW_{ns} = LW \, \text{Cos}(CH + 90°)$ if wind is on Port $LW \, \text{Cos}(CH - 90°)$ if wind is on Starboard $CUD_{ns} = CUD \, \text{Cos}CUS,$ and then by calculating the component of boat speed in the east/west direction, i.e.

$$ABS_{ew} = HS_{ew} + LW_{ew} + CUD_{ew}$$

ps where:

$HS_{ew} = HS \, \text{Sin}CH$ $LW_{ew} = LW \, \text{Sin}(CH + 90°)$ if wind is on Port $LW \, \text{Sin}(CH - 90°)$ if wind is on Starboard $CUD_{ew} = CUD \, \text{Sin}CUS$ and then combining these two components to obtain a composite vector:

$$ABS = [(ABS_{ns})^2 + (ABS_{ew})^2]^{\frac{1}{2}}$$

ACTUAL BOAT DIRECTION (calculated value)

Figure 5B:
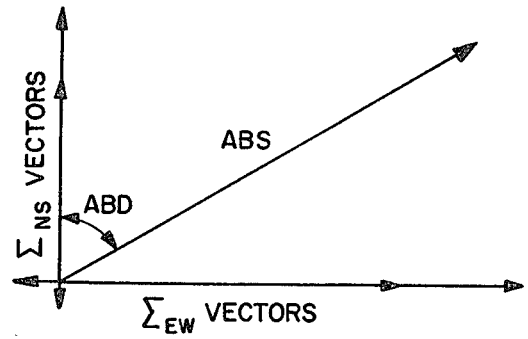

Alpha:
ABD
Numeric:

indicates in degrees referred to magnetic compass north, as shown in FIG. 5B, the direction of movement of the vessel over the bottom.

$$ABD = \text{Sin}^{-1}\left(\frac{|ABS_{ew}|}{ABS}\right)$$

corrected for proper quadrant as designated by the sign of ABS, where the (+) sign represents N and E and the (−) sign represents S and W.

ACTUAL WIND SPEED (calculated value)

Alpha:
AWS
Numeric
displays actual wind speed with respect to the bottom, as determined by first calculating the component of wind speed in the north/south direction, i.e.

$$AWS_{ns} = RWS_{ns} - ABS_{ns}$$

where:

$$RWS_{ns} = RWS \text{ Cos } (RWD + CH),$$

then calculating the component of wind speed in the east/west direction, i.e.

$$AWS_{ew} = RWS_{ew} - ABS_{ew}$$

where:

$$RWS_{ew} = RWS \text{ Sin } (RWD + CH),$$

and then combining the components as follows:

$$AWS = [(AWS_{ns})^2 + (AWS_{ew})^2]^{\frac{1}{2}}$$

ACTUAL WIND DIRECTION (calculated value)

Alpha:
AWD
Numeric:
indicates actual direction from which the wind is blowing referred to magnetic compass north.

$$AWD = \text{Sin}^{-1}\left(\frac{|AWS_{ew}|}{AWS}\right)$$

corrected for proper quadrant as designated by the sign of AWS.

COURSE AND DISTANCE (calculated values)

Figure 4:
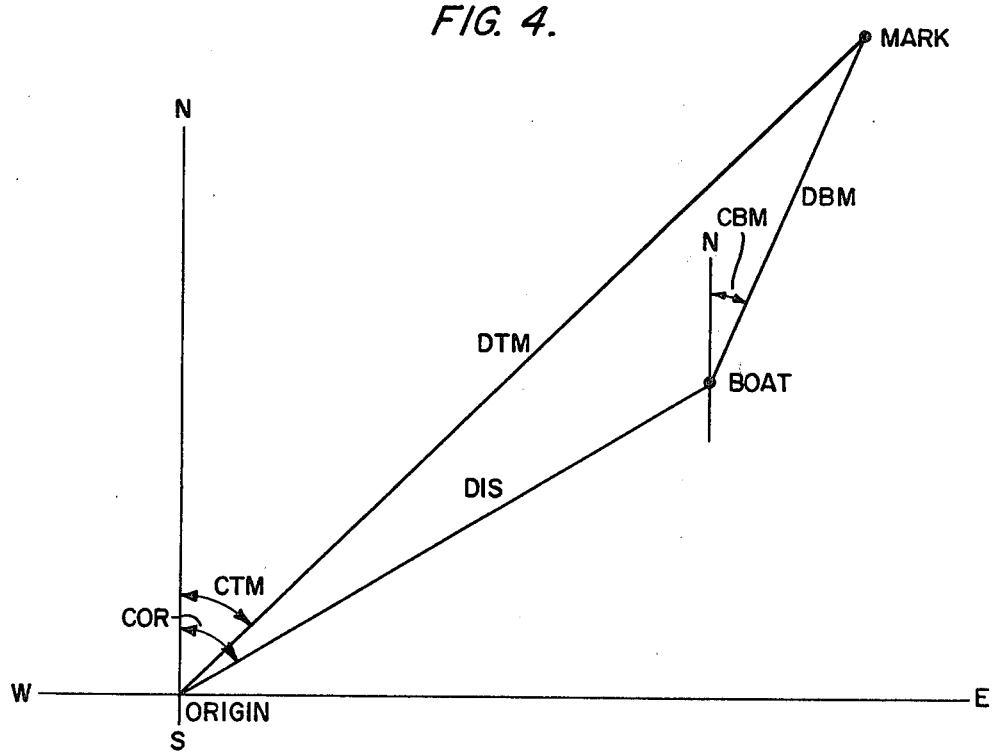
FIG. 4 is a vector diagram showing the progress of a boat heading from an origin point to a destination mark.

Alpha:
COR for one readout period followed by DIS for a second readout period, called up by a single Display Control Switch.
Numeric:
when alpha reads COR, the indication as shown in FIG. 4 is the angle in degrees, referred to magnetic compass north, of a line from the origin to the boat. When alpha reads DIS, the indication is the distance of the boat from the origin in the COR direction. In both cases, the origin represents the location of the boat at the beginning of a computed leg of the journey when the distance from origin information is allowed to begin to accumulate in the RAM 22 following the clearing of those memory locations holding distance information and course information calculated during a previous leg.

$$DIS_{ew} = \sum_{o}^{n} ABS_{ew} \times t$$

$$DIS_{ns} = \sum_{o}^{n} ABS_{ns} \times t$$

where t is the time between calculations (usually the display period) and n is the number of t intervals since the vessel left the origin.

$$DIS = [(DIS_{ew})^2 + (DIS_{ns})^2]^{\frac{1}{2}}$$

$$COR = \text{Sin}^{-1}\left(\frac{|DIS_{ew}|}{DIS}\right)$$

corrected for proper quadrant as designated by the sign of DIS.

COURSE OF MARK FROM BOAT, DISTANCE OF MARK FROM BOAT, SPEED OF BOAT TOWARD MARK, SPEED OF BOAT FROM MARK (calculated values)

Alpha:
CBM, course boat to mark; DBM, distance boat to mark; STM or SFM, (one displayed) representing speed toward mark if movement of vessel is toward mark, or alternatively speed from mark if movement of vessel is away from mark one or other automatically called up in accordance with the data.
Numeric:
all three variables displayed in sequence when selected by a single Display Control Switch as shown in FIG. 3. Referring now to FIG. 4:

$$DTM_{ns} = DTM \text{ Cos CTM}$$

$$DTM_{ew} = DTM \text{ Sin CTM}$$

where DTM is distance from origin to mark and CTM is magnetic bearing of mark from origin, manually put into the system as fixed parameters at switches 7 and 6.

$$DBM_{ns} = DTM_{ns} - DIS_{ns}$$

$$DBM_{ew} = DTM_{ew} - DIS_{ew}$$

$$DBM = [(DBM_{ns})^2 + (DBM_{ew})^2]^{\frac{1}{2}}$$

$$CBM = \text{Sin}^{-1}\left(\frac{|DBM_{ew}|}{DBM}\right)$$

corrected for quadrant as designated by the sign of DBM.

$$STM, \text{ or } SFM = (DBM_n - DBM_{n-1}) \div t$$

STM called up on alpha display if result is positive, SFM if result is negative, n and t being defined in the next preceeding calculation of COR and DIS.

In the foregoing examples of readouts, both measured and calculated, many of them involve direction as detected by the heading sensor 5 in FIG. 1. These calculations were made on the assumption that the heading sensor was a fluxgate or a magnetic compass, and therefore the calculations are with reference to magnetic north. However, if a gyro compass were used the headings would be referenced to true north. In the event that true north headings are required where magnetic instrumentation is used, it is possible to insert by manual switches a correction for variation so as to convert magnetic to true headings.

Many other readouts are contemplated, and can be selected for any particular system. One possibility is to calculate and display integrated compass headings which are averaged over a period of time beginning at the moment when the boat leaves the origin so as to show the actual average heading of the boat during a particular leg of the journey, or tack. This is quite easily accomplished by simple integration, except in the vicinity of 360 degrees and 0 degrees in cases where the boat alternates back and forth between a heading to the left of north and a heading to the right of north on the compass card. This particular situation creates a serious discontinuity as the heading passes through north. For instance, if there were 4 consecutive readings such as 357, 359, 003, and 005 degrees, a mere numerical averaging of these headings would produce 181 degrees which is an obvious error. A solution to the problem is to have the present system scan the last n headings to ascertain if the readings pass through 0 degrees. If they do, the scannings for all of the values will be normalized based upon the sector containing the first reading in the most recent sequence. In the above stated example, the first value is in the sector between 270 and 360 degrees, and therefore all readings will be normalized by adding 360 to those values lying in the sector between 0 and 90 degrees. Thus, the new sequence would be 357, 359, 363, and 365, having an average of 361 degrees. Since this average value exceeds 360, the program then subtracts 360 from the result, which will give a proper reading in all cases. The final displayed value will therefore be 001 degree. On the other hand, if the sequence were 003, 359, and 357, since the initial value is in the sector from 0 to 90 degrees, all readings are referenced to 0. After normalization, the series would read 005, 003, minus 001, minus 003. This averages out to 001 degrees. If the average had turned out to be a minus quantity, the program would add 360 degrees to provide the proper display.

Another more sophisticated readout calculation would be to make a determination as to the real time when the vessel can go onto the opposite tack and sail toward the mark. This involves an input of real time, and may advantageously be accompanied on the display by readouts of real time, and perhaps other readouts such as a stopwatch function.

Still another use to which the microprocessor system can be put is to provide automatic steering outputs which can be used to follow a compass heading which is set into the system, perhaps using digital thumb switches.

The system can also be used to provide an output figure representing sailing efficiency, and can further be used to provide safety monitoring of such values as excessive heel, depth sounding, bilge level, explosive air mixture, etc.

The present invention is not to be limited to the exact form shown in the preferred embodiment, but can be altered within the scope of the following claims.

I claim:
1. A navigational aid system for use in navigating a vessel toward a destination mark whose course and distance are known, comprising:
    (a) means for measuring variable navigational parameters defining the motion of the vessel relative to the water, the motion of the wind relative to the vessel and the compass heading of the vessel;
    (b) means for converting the parameters sequentially into digital data inputs;
    (c) addressable memory means for storing data in digital form;
    (d) manually settable fixed parameter means for inserting information defining said course and distance to said destination mark and for defining current drift and set, along said course the information being stored in the addressable memory means in the form of digital data inputs;
    (e) a microprocessor having input and output ports, and having a main routine and subroutines for calculating navigational output data from said measured and fixed data inputs and for continuously updating and storing said input and output data as digital data in said addressable memory means;
    (f) a digital display operative to display selected digital data; and
    (g) multiple actuatable selection means corresponding respectively with the various input and output digital data stored in said memory means, said selection means being connected with the microprocessor to be sequentially polled thereby during said routines, and the microprocessor being operative to transfer that digital data which corresponds with each actuated selection means for display on said digital display.

2. The system as claimed in claim 1, wherein the system further includes means within said microprocessor operative in response to the actuation and polling of each selection means generate alpha indicia uniquely identifying the output data selected; and means operative to deliver the indicia to the display together with the corresponding digital data being displayed.

3. The system as claimed in claim 1, further including a time clock having an output determining the length of the time interval during which each selected digital data is displayed, and having other clock outputs to the microprocessor operative to clock its main routine during said display intervals; and latch means for latching the display during each of said intervals.

4. The system as claimed in claim 1, wherein the selection means corresponding with each selectable data comprises a switch manually actuable to select that data for display.

5. The system as claimed in claim 1, wherein said selection means further includes a switch operative when actuated to clear the data stored in said memory means when establishing a new origin and destination mark.

6. The system as claimed in claim 1, wherein said digital display and said multiple selection means are contained in separately mounted cabinets.

7. The system as claimed in claim 1, wherein said converting means includes means for delivering a ready signal at the completion of each conversion of a parameter; and wherein said system includes a microprocessor interrupt routine initiated by said ready signal and operative after interruption of the main routine to deliver a digital data input to an address in said memory means corresponding to the parameter represented by that data input, and then to return to the main routine.

8. A navigational aid system for use in navigating a boat along a course from an origin to a destination mark, comprising:
   (a) sensor means for measuring data defining the motion of the boat relative to the water, and for measuring data defining the heading of the boat;
   (b) manual means for entering data representing the direction and distance from the origin to the mark, and representing the set and drift of the current along said course; and
   (c) microprocessor means connected to receive data from said sensor means and said manual means and operative to repeatedly compute therefrom data representing the actual speed and direction of the boat, and to integrate computed data with respect to real time to obtain data representing the distance and direction of the boat from the origin, and operative to compute data representing the distance and direction of the boat to the mark based on the manually entered distance and direction of the mark relative to the origin minus the distance and direction of the boat from the origin.

9. The system as claimed in claim 8, further including a digital display, multiple selection means coupled the microprocessor means and manually actuatable to indicate on the display those data which are selected by actuation of the selection means; and the system including memory means having a routine for polling the selection means to determine which data are selected for display.

10. The system as claimed in claim 9, said memory means further including a routine for generating alpha indicia uniquely identifying each data selectable for display, and means for displaying the appropriate alpha indicia along with each data when selected for display.

11. The system as claimed in claim 9, wherein said sensor means further include means for measuring data representing wind direction and velocity relative to the boat, and the microprocessor means further includes means operative to compute data representing the absolute wind direction and velocity and the wind direction relative to the heading of the boat.

12. The system as claimed in claim 9, wherein the sensor means includes means for measuring the forward speed and leeway speed of the boat, and compass means for determining the heading of the boat.

13. The system as claimed in claim 12, wherein the microprocessor means includes means for calculating data representing the actual direction of hull motion based upon data representing the forward and leeway speed of the boat and the current set and drift.

* * * * *